US011345179B2

(12) United States Patent
Imhof et al.

(10) Patent No.: US 11,345,179 B2
(45) Date of Patent: May 31, 2022

(54) OPTICALLY VARIABLE SECURITY ARRANGEMENT (71) Applicant: GIESECKE+DEVRIENT CURRENCY TECHNOLOGY GMBH, Munich (DE)

(72) Inventors: Martin Imhof, Munich (DE); Raphael Dehmel, Neubeuern (DE); Christian Fuhse, Otterfing (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 0 days.

(21) Appl. No.: 16/628,397

(22) PCT Filed: Jul. 6, 2018

(86) PCT No.: PCT/EP2018/000347
§ 371 (c)(1),
(2) Date: Jan. 3, 2020

(87) PCT Pub. No.: WO2019/007549
PCT Pub. Date: Jan. 10, 2019

(65) Prior Publication Data
US 2020/0156398 A1 May 21, 2020

(30) Foreign Application Priority Data
Jul. 7, 2017 (DE) ...................... 10 2017 006 421.0

(51) Int. Cl.
*B42D 25/324* (2014.01)
*B42D 25/342* (2014.01)
(Continued)

(52) U.S. Cl.
CPC ......... *B42D 25/324* (2014.10); *B42D 25/342* (2014.10); *G02B 5/09* (2013.01);
(Continued)

(58) Field of Classification Search
CPC ............................ B42D 25/324; B42D 25/342
See application file for complete search history.

(56) References Cited

U.S. PATENT DOCUMENTS 8,400,495 B2   3/2013   Kaule
8,878,844 B2   11/2014  Kaule et al.
(Continued)

FOREIGN PATENT DOCUMENTS

CN   101952128 A   1/2011
CN   103229078 A   7/2013
(Continued)

OTHER PUBLICATIONS

International Search Report and Written Opinion from PCT Application No. PCT/EP2018/000347, dated Jan. 16, 2019.
(Continued)

*Primary Examiner* — Kyle R Grabowski
(74) *Attorney, Agent, or Firm* — Workman Nydegger (57) ABSTRACT

An optically variable security arrangement for securing valuable articles, comprises a first sub-element having a two-dimensional relief grid composed of a plurality of grid elements and that has, in at least one spatial direction $R_1$, a first line screen p below 500 μm, and in which the grid elements are each formed from at least two relief elements that are directionally reflective in different directions, and a second sub-element having at least one dot and/or line grid that, in a spatial direction $R_2$, has a second line screen q. A movement effect is created by the interplay of the relief grid and the dot and/or line grid when the security arrangement is tilted.

21 Claims, 7 Drawing Sheets (51) Int. Cl.
*G02B 5/09* (2006.01)
*B42D 25/21* (2014.01)
*B42D 25/23* (2014.01)
*B42D 25/24* (2014.01)
*B42D 25/29* (2014.01)
*B42D 25/373* (2014.01)
*B42D 25/425* (2014.01)

(52) U.S. Cl.
CPC .............. *B42D 25/21* (2014.10); *B42D 25/23* (2014.10); *B42D 25/24* (2014.10); *B42D 25/29* (2014.10); *B42D 25/373* (2014.10); *B42D 25/425* (2014.10)

(56) References Cited

U.S. PATENT DOCUMENTS

| | | | |
|---|---|---|---|
| 9,176,266 B2 | 11/2015 | Fuhse et al. | |
| 9,802,437 B2 | 10/2017 | Holmes | |
| 9,827,802 B2 | 11/2017 | Fuhse et al. | |
| 10,134,109 B2 | 11/2018 | Kaule et al. | |
| 10,569,592 B2* | 2/2020 | Lister | B42D 25/342 |
| 2008/0258456 A1* | 10/2008 | Rahm | B42D 25/324 283/85 |
| 2010/0177094 A1 | 7/2010 | Kaule et al. | |
| 2010/0208036 A1 | 8/2010 | Kaule | |
| 2011/0007374 A1 | 1/2011 | Heim | |
| 2011/0157183 A1 | 6/2011 | Kaule et al. | |
| 2012/0319395 A1 | 12/2012 | Fuhse et al. | |
| 2013/0093172 A1* | 4/2013 | Fuhse | B42D 25/24 283/67 |
| 2014/0037898 A1* | 2/2014 | Tompkin | B42D 25/324 428/141 |
| 2014/0247499 A1* | 9/2014 | Doublet | B42D 25/324 359/627 |
| 2015/0084962 A1 | 3/2015 | Kaule et al. | |
| 2016/0023495 A1* | 1/2016 | Fuhse | B42D 25/342 359/566 |
| 2016/0176221 A1 | 6/2016 | Holmes | |
| 2017/0021660 A1* | 1/2017 | Petiton | B42D 25/324 |
| 2018/0001690 A1 | 1/2018 | Fuhse et al. | |
| 2018/0117948 A1* | 5/2018 | Power | B42D 25/342 |
| 2018/0117949 A1* | 5/2018 | Fuhse | B42D 25/324 |
| 2019/0358988 A1* | 11/2019 | Yashiki | B42D 25/324 |

FOREIGN PATENT DOCUMENTS

| | | |
|---|---|---|
| CN | 105636798 A | 6/2016 |
| EP | 2331343 A1 | 6/2011 |
| WO | 2009000530 A2 | 12/2008 |
| WO | 2011066990 A2 | 6/2011 |
| WO | 2011066991 A2 | 6/2011 |
| WO | 2012055505 A1 | 5/2012 |
| WO | 2017011476 A1 | 1/2017 |

OTHER PUBLICATIONS

Search Report from corresponding Chinese Application No. 2018800449318, dated Jul. 26, 2020.

* cited by examiner

OPTICALLY VARIABLE SECURITY ARRANGEMENT

BACKGROUND

The present invention relates to optically variable security arrangements for securing valuable articles, and a data carrier furnished with such a security arrangement.

For protection, data carriers, such as value or identification documents, or other valuable articles, such as branded articles, are often provided with security elements that permit the authenticity of the data carriers to be verified, and that simultaneously serve as protection against unauthorized reproduction.

Security elements having viewing-angle-dependent effects play a special role in safeguarding authenticity, as these cannot be reproduced even with the most modern copiers. Here, the security elements are furnished with optically variable elements that, from different viewing angles, convey to the viewer a different image impression and, depending on the viewing angle, display for example another color or brightness impression and/or another graphic motif.

In this regard, easily verifiable, colored and dynamic human features are of particular interest both in security printing and in packaging printing. Currently, such features are realized primarily through holograms and hologram-like designs, but these place considerable technological demands on the manufacturing process and thus cannot be used economically for all applications.

SUMMARY

Proceeding from this, the object of the present invention is to specify an optically variable security arrangement of the kind mentioned above that avoids the disadvantages of the background art. In particular, there is to be provided a security arrangement that is easy and economical to manufacture and that, in a verification position, displays visually appealing movement effects when tilted.

Here, the term "security arrangement" refers to designs having at least two sub-elements that can be firmly joined together, but that can also be present separately and be brought into a verification position only for the authenticity check. If, in the verification position, the sub-elements are firmly joined together, the security arrangement is also often referred to as a "security element".

In a first aspect, the present invention relates to an optically variable security arrangement for securing valuable articles, having
a first sub-element having a two-dimensional relief grid that is composed of a plurality of grid elements and that has, in at least one spatial direction $R_1$, a first line screen p below 500 μm, and in which the grid elements are each formed from at least two relief elements that are directionally reflective in different directions, and
a second sub-element having at least one dot and/or line grid that, in a spatial direction $R_2$, has a second line screen q,
the first and second sub-element, in a verification position, being stacked vertically in such a way that said spatial direction $R_1$ of the first sub-element is parallel to said spatial direction $R_2$ of the second sub-element and the vertical spacing between the relief grid and the dot and/or line grid is less than half of the line screen p,
the second line screen q differing only slightly from the first line screen p, especially by less than one-fifth, and/or the first line screen p and/or the second line screen q being location-dependently modulated such that, in said verification position, a movement effect is created by the interplay of the relief grid and the dot and/or line grid when the security arrangement is tilted, the grid elements of the first sub-element each producing substantially the reflection behavior of a given concave and/or convex curvature that is defined at each position by a normalized local normal vector, and
the grid elements of the first sub-element including, as directionally reflective relief elements, a plurality of micromirrors whose inclination against the x-y plane of the first sub-element is determined by the indication of its normalized normal vector, and the normal vector of a micromirror at a position $(x_0, y_0)$ being determined by the local normal vector of the given curvature at said position, modified, however, by a random or pseudorandom angle modulation of the normal vector in at least one spatial direction.

Pseudo-random numbers are strings of numbers that appear to be random but are calculated by a deterministic algorithm and thus, in the strict sense, are not true random numbers. Nevertheless, pseudorandom numbers are widely used, since the statistical properties of a pseudorandom number distribution, such as equal probability of the individual numbers or the statistical independence of consecutive numbers, are normally sufficiently irregular for practical purposes, such as, presently, for the pseudorandom angle modulation of the normal vector, and pseudorandom numbers are easy to produce with computers, in contrast to true random numbers.

Here, there is preferably a modification by a random or pseudorandom angle modulation of the normal vector only in one spatial direction, the angle modulation preferably having a maximum value of less than 5°, or of less than 3°. If the modification is present in a spatial direction that is perpendicular to said spatial direction $R_2$ of the second sub-element, the maximum value of the random or pseudorandom angle modulation can also take on considerably larger values.

There can likewise advantageously be a modification by a random or pseudorandom angle modulation of the normal vector in two spatial directions that are perpendicular to each other, the maximum angle modulation in the two spatial directions preferably being of different sizes and the larger maximum angle modulation preferably being at least 2 times, particularly preferably at least 5 times, and especially at least 10 times larger than the smaller maximum angle modulation.

The grid elements of the first sub-element advantageously produce substantially the reflection behavior of a concave or convex mirror, especially the reflection behavior of a parabolic concave or parabolic convex mirror. Generally, the grid elements can, of course, also produce more complex curvatures that, for example, are concave in sub-regions and convex in other sub-regions. Further, the reflection behavior produced by the grid elements need not be identical for all grid elements. In addition, in a "smart" first sub-element, the given curvature includes a location-dependent modulation that extends across multiple grid elements and that, in combination with a "dumb" or likewise "smart" dot and/or line grid, produces a pattern or a piece of information, especially a viewing-angle-dependent colored and dynamic feature.

In another aspect, the present invention relates to an optically variable security arrangement for securing valuable articles, having
a first sub-element having a two-dimensional relief grid that is composed of a plurality of grid elements and that has, in at least one spatial direction $R_1$, a first line screen p below 500 μm, and in which the grid elements are each formed from at least two relief elements that are directionally reflective in different directions, and a second sub-element having at least one dot and/or line grid that, in a spatial direction $R_2$, has a second line screen q, the first and second sub-element, in a verification position, being stacked vertically in such a way that said spatial direction $R_1$ of the first sub-element is parallel to said spatial direction $R_2$ of the second sub-element and the vertical spacing between the relief grid and the dot and/or line grid is less than half of the line screen p, the second line screen q differing only slightly from the first line screen p, especially by less than one-fifth, and/or the first line screen p and/or the second line screen q being location-dependently modulated such that, in the verification position, a movement effect is created by the interplay of the relief grid and the dot and/or line grid when the security arrangement is tilted, and the relief elements of at least a portion of the grid elements being arranged aperiodically in the areal region of the respective grid element.

Here, the relief elements are advantageously formed by micromirrors that are inclined against the x-y plane of the first sub-element and the micromirrors are arranged in the areal region of the respective grid element in varying shapes and/or sizes. In particular, it is advantageously provided that the micromirrors in the areal region are arranged in aperiodically or even irregularly varying shapes and/or sizes.

Here, the micromirrors advantageously have, in the plane of the areal region of the respective grid element, a minimum dimension of 2 μm or more, especially of 10 μm or more. The reason for the choice of not-too-small micromirror dimensions here lies especially in the fact that a light beam that is reflected on the micromirrors is expanded due to diffraction, such that very small micromirrors produce only faint, blurred image points.

In principle, the shape of the micromirrors can be chosen arbitrarily. In addition to designs having a rectangular contour and an irregular contour, the micromirrors can, for example, also be developed having a round contour, having an oval contour, having a triangular contour or having a polygonal contour. The shape of the micromirrors can also be chosen such that their lateral dimension in one direction is substantially larger than in the lateral direction perpendicular thereto. In this way, in two spatial directions, different diffraction-induced resolving powers can result that can be advantageous in special cases. For instance, a micromirror can be very long especially in the direction in which it does not ascend. In this way, the corresponding reflex in the projection is barely expanded in one direction, while the height of the micromirror is still advantageously small. The shape of the micromirrors can also constitute a further hidden security feature that reveals itself to an inspector only by means of an auxiliary means, for example a light microscope or a strong magnifier.

In one advantageous embodiment, the relief elements of all grid elements are arranged aperiodically in the areal region of the respective grid element.

In a further aspect, the present invention relates to an optically variable security arrangement for securing valuable articles, having a first sub-element having a one- or two-dimensional relief grid that is composed of a plurality of grid elements and that has, in at least one spatial direction $R_1$, a first line screen p below 500 μm, and in which the grid elements are each formed from at least two relief elements that, at least in one motif region of the relief grid, are developed to be directionally reflective in different directions, a second sub-element having at least one dot and/or line grid that, in a spatial direction $R_2$, has a second line screen q, the first and second sub-element, in a verification position, being stacked vertically in such a way that said spatial direction $R_1$ of the first sub-element is parallel to said spatial direction $R_2$ of the second sub-element and the vertical spacing between the relief grid and the dot and/or line grid is less than half of the line screen p, the relief grid comprising, in addition to said motif region, a background region, and in the motif region, the first line screen p being location-dependently modulated such that, in the verification position, a movement effect is created in the motif region by the interplay of the relief grid and the dot and/or line grid when the security arrangement is tilted, and in the background region, the relief elements being modified in order to produce, in the verification position, a visual contrast to the movement effect of the motif region.

In one advantageous embodiment, the relief elements in the background region are modified in such a way that they produce a dark background for the movement effect of the motif region.

This can be ensured, for example, in that the relief elements in the background region are indeed reflective, but are arranged in randomly or pseudorandomly varying reflection directions, or in that the relief elements are furnished with a non-periodic roughness, or in that the relief elements are combined with a scattering matte pattern, or in that the relief elements are furnished with light-absorbing patterns, such as moth-eye patterns.

A darkening of the background region can also be achieved in that, in the background region, small micromirrors having steep flank angles are used or micromirrors that reflect light to different spatial regions than the relief elements of the motif region.

In particular, the relief elements of the motif region and the background region can each be formed by micromirrors, the micromirrors of the background region being modified, in one or more of the ways mentioned, for the darkening with respect to the micromirrors of the motif region.

In a further possibility for producing a visual contrast between the motif region and the background region, the relief elements of the background region are developed in such a way that, there, a clearly perceptible change in hue or change in luster compared with the motif region is created. For example, there can be provided in the background region a triangle pattern or a trough pattern that has the same line screen q as the dot and/or line grid of the second sub-element. In contrast to the (colored) movement effect of the motif region, the background can then display a static color impression that can especially be monochrome in some regions and, for example, can appear having a first color on one side of the motif region and having a second color on another side of the motif region. The background region can also display a moiré gradient of different colors. Particularly in the latter case, the specific appearance can differ slightly from up to up of the security arrangements.

Finally, the visual contrast between the motif region and the background region can also be produced by a brightening of the background region with respect to the motif region. For this, the background region can, for example, be furnished with a washable ink or an ink-receiving layer that is modified in some regions and that has an elevated IR absorptivity. The background region modified in this way is then ablatable with an IR laser, while the motif region is preserved upon laser impingement, even with an overprinted dot and/or line grid. In this way, even registered motifs can be produced.

Alternatively, when manufacturing the foil of a first sub-element that is developed as a foil, also a demetalization step can occur in the background region to produce the desired visual contrast with the motif region. By means of laser impingement, the background region can also be decolorized or a background print removed.

In all inventive aspects mentioned, in one advantageous variant of the present invention, the first sub-element and the second sub-element of the security arrangement are firmly joined together in the verification position. For this, the two sub-elements can, for example, be laminated together or the sub-elements can be produced successively one on top of another at manufacture. The first sub-element can especially be developed in the form of a foil element that is applied to or introduced into a security document. The second sub-element can especially be formed by a printing element that, after the application or introduction of the first sub-element, is advantageously printed over said first sub-element.

In some designs, however, it is advantageous when the sub-elements of the security arrangement are present as separate elements that are brought into the verification position on top of one another only for the authenticity check. For this, the sub-elements can be present on different data carriers or also on the same data carrier and be brought on top of one another, for example, by folding the data carrier.

In one advantageous development, it is provided that, in a sub-region, the two-dimensional relief grid includes first and second optically equivalent grid elements whose composition composed of relief elements differs and/or in which the arrangement of the relief elements differs, the first and second grid elements being arranged in the form of a motif, not visible with the naked eye, in the form of a pattern, characters or a code.

Here, in one advantageous embodiment, the first and second grid elements differ in the spatial arrangement of the relief elements within the grid elements. In particular, it can be provided that the relief elements of the first grid elements are arranged periodically and the relief elements of the second grid elements aperiodically, or vice versa. Also, different periodic or different aperiodic designs in the first and second grid elements may be considered.

According to a likewise advantageous embodiment, the first and second grid elements differ alternatively or additionally in the contour shape and/or the size of the relief elements included.

In particularly advantageous designs, the grid elements of the first sub-element include, as directionally reflective relief elements, a plurality of micromirrors whose inclination, as already explained above, against the x-y plane of the first sub-element is determined by the indication of its normalized normal vector, and the normal vector of a micromirror at a position $(x_0, y_0)$ being determined by the local normal vector of the given curvature at said position, modified, however, by a random or pseudorandom angle modulation of the normal vector in at least one spatial direction. In said designs, the first and second grid elements can especially differ by the angle modulation of the normal vector in at least one spatial direction. For this, the angle modulation can, for example, have different variation values in the first and second grid elements, or the angle modulation can be in different directions, for example there can be, in the first grid elements, only a modulation of the x-angle, and in the second grid elements, only a modulation of the y-angle. One kind of grid element can, as a contrast, also be developed without an angle modulation or with an angle modulation near zero, for example less than 0.1°.

In all inventive variants mentioned, the following advantageous designs can be present:

At least one, preferably all of the dot and/or line grids can be developed as line grids. Here, at least one line grid can be a print line grid that preferably is formed at least in a sub-region from a plurality of substantially parallel print lines having a spacing q. The print line grid can be separated from the relief grid by a spacing layer, the spacing layer advantageously including an embossing lacquer layer in which the relief elements of the relief grid are embossed.

The relief elements of the relief grid can be furnished with a reflection-increasing coating, especially a metalization.

At least one dot and/or line grid can be formed by a reflection-increasing coating, present in dot- and/or line-grid form, of the relief elements of the relief grid. Here, the relief grid can be combined with a background layer, especially a contiguous ink layer, that lies below the reflection-increasing coating.

The vertical spacing between the relief grid and the line grid can be less than one-fifth, preferably less than one-tenth of the line screen p, especially less than 15 µm.

In some designs, the relief grid can be a one-dimensional grid composed of a plurality of elongated grid elements that has said line screen p, and in which the grid elements are each formed from at least two line-type relief elements that are directionally reflective in different directions. Here, the grid elements can each be formed from a plurality of line-type micromirrors or from a cylindrical Fresnel mirror pattern.

In other designs, the relief grid can be a two-dimensional grid that is composed of a plurality of grid elements and that has, in a first spatial direction, said line screen p, and in which the grid elements are preferably each formed from at least two, preferably at least three, particularly preferably at least four relief elements that are directionally reflective in different directions. Here, the grid elements can each also be formed from a circular or elliptical arrangement of a plurality of micromirrors or a spherical or elliptical Fresnel mirror pattern, and they can be arranged having a motif-shaped contour and spaced apart from each other.

The grid elements can each be formed from a plurality of relief elements that are directionally reflective in different directions, can especially be formed, in a one-dimensional grid, of at least ten line-type relief elements that are directionally reflective in different directions, and in a two-dimensional grid, of at least 10×10 relief elements that are directionally reflective in different directions.

The reflective relief elements of each grid element can be arranged and developed in such a way that the grid element produces the reflection behavior of a concave or convex curvature.

The grid elements can all be developed to be congeneric, or the relief grid can include two or more different grid elements that preferably each produce different movement effects when the security arrangement is tilted.

The dot and/or line grid can comprise a plurality of parallel lines that run substantially perpendicular to the first spatial direction. Also, two or more dot and/or line grids that are arranged vertically above or below the relief grid can be provided, in particular, at least one dot and/or line grid can be arranged above and at least one dot and/or line grid below the relief grid.

The first line screen p can be fixed, and the second line screen q location-dependently modulated, or the second line screen q can be fixed, and the first line screen p location-dependently modulated. The first and/or second line screen can especially be location-dependently modulated in that the positions of the grid elements of the relief grid or of the dot and/or line grid are given by a phase function $\phi(x,y)$ that depends on the position (x,y) of the grid element in the security element and whose function value indicates the deviation of the position of the grid element from the position of a grid point in a regular grid, normalized to the unit interval [0,1], and the phase function $\phi(x,y)$ varying location-dependently in such a way that a movement effect, especially a pump or rotation effect, is created when the security element is tilted.

The present invention also includes a data carrier having a security arrangement of one of the kinds described, in a preferred design, at least one line grid of the security arrangement covering the relief grid in sub-regions and, in sub-regions outside of the relief grid, extending to the data carrier provided with the security arrangement. In this way, the security arrangement is secured on the data carrier and integrated into its design. Any potential manipulation or even removal and transfer of the security arrangement to another data carrier is not easily possible due to the required registration of said sub-regions. Here, the sub-region of the line grid that extends outside of the relief grid to the data carrier advantageously appears as a halftone area.

The data carrier can especially be a value document, such as a banknote, especially a paper banknote, a polymer banknote or a foil composite banknote, a stock, a bond, a certificate, a voucher, a check, a valuable admission ticket, but also an identification card, such as a credit card, a bank card, a cash card, an authorization card, a personal identity card or a passport personalization page. The data carrier can also be a decorative item, such as packaging, fan merchandise or a clothing label, or also a package insert for drugs. If the data carrier is a foil element, said foil element can also constitute a packaging foil that encases a further packaging.

In this description, the sub-element of the security arrangement whose line screen is location-dependently modulated is also referred to as "smart", since the location-dependent modulation includes a desired piece of information. A sub-element whose line screen is unmodulated is also referred to as "dumb", since it includes no further piece of information beyond the regular grid. Typically, one of the two sub-elements of the security arrangement is developed to be smart and one dumb, but it is also possible to develop both sub-elements to be smart.

Said movement effect can especially display moving lines or bars, also having multiple line or bar patterns moving in opposite directions. The movements can, but need not, be rectilinear, but rather can, for example, also run in a curve and, in the case of multiple line or bar patterns, intertwined. As further movement effects, pump and rotation effects, for example, may be used. All movement effects are preferably colored, especially multicolored.

Due to their small thickness, security arrangements having sub-elements that are firmly joined together, or also the sub-elements of the security arrangements are particularly well suited for application to banknotes and other value documents. Especially in the field of packaging, it can also be expedient when the sub-elements are not are firmly joined together, but rather are present on different packaging parts and only in the verification position are stacked with a vertical spacing of less than half the line screen.

BRIEF DESCRIPTION OF THE DRAWINGS

Further exemplary embodiments and advantages of the present invention are explained below by reference to the drawings, in which a depiction to scale and proportion was dispensed with in order to improve their clarity.

Shown are:

FIG. 1 a schematic diagram of a banknote having an optically variable security arrangement, FIG. 2a security arrangement in cross section, FIGS. 3(a) and 3(b) to explain the formation of the fine line grid, in 3(a), only the relief grid of the security arrangement in FIG. 2, and in 3(b), the visual appearance of the relief grid in 3(a), FIG. 4, 5 different security arrangements in cross section, FIGS. 6(a) to 6(c) in 6(a), a perspective view of a concave curvature in the form of a concave mirror whose reflection behavior is produced by a grid element of the first sub-element of a security arrangement according to the present invention, (a) in 6(b), for the y-z plane, schematically, the progression of the y-angle $\alpha_y$ of the normal vector N of the given curvature shown in 6(a), as a solid curve, and the y-angle $\alpha_{MS,y}$ of the normal vector $N_{MS}$ for the micromirrors arranged at the corresponding position, as full dots, and (b) in 6(c), for the x-z plane, schematically, the progression of the x-angle $\alpha_x$ of the normal vector N of the given curvature shown in 6(a), as a solid curve, the unmodified x-angle of the normal vector $N_{MS}$ for the micromirrors arranged at the corresponding position, as full dots, and the pseudorandomly modulated x-angle $\alpha_{MS,x}$ of the micromirrors, as unfilled dots, FIG. 7 a top view of a security arrangement according to another exemplary embodiment of the present invention, FIGS. 8(a) to 8(c) in 8(a) to 8(c), in each case the arrangement of the micromirrors within the section VIII, marked in FIG. 7, of a grid element, in detail, FIGS. 9(a) to 9(c) in 9(a), a section of the first sub-element of a security arrangement according to the present invention, in 9(b) a highly magnified section of the second sub-element of said security arrangement, and in 9(c), schematically, the appearance of the complete security arrangement in the verification position with the vertically stacked first and second sub-elements, and FIG. 10 a top view of the relief grid of a security arrangement according to a further exemplary embodiment of the present invention.

DETAILED DESCRIPTION OF VARIOUS EMBODIMENTS

Figure 1:
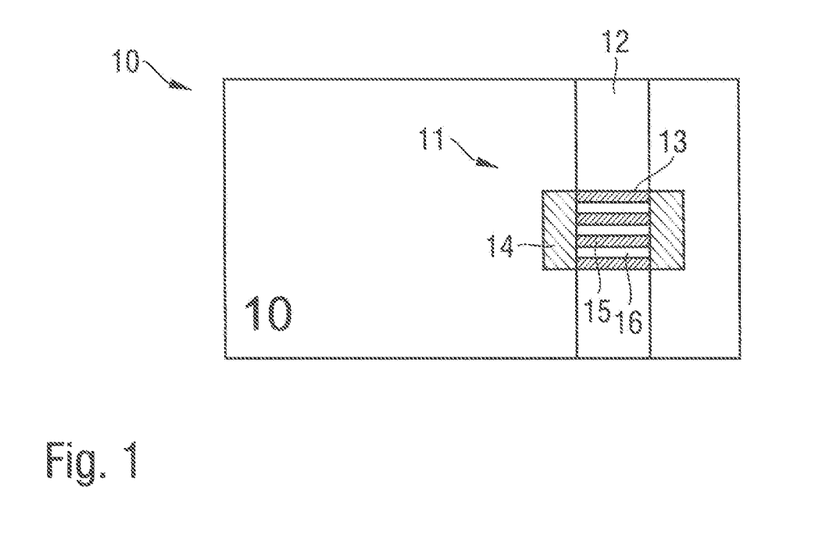

The present invention will now be explained using the example of security arrangements for banknotes. For this, FIG. 1 shows a schematic diagram of a banknote 10 that is furnished with an optically variable security arrangement 11 according to the present invention. The security arrangement 11 comprises, as the first sub-element, a foil strip 12 that is applied to the banknote substrate and that is furnished in a sub-region 13 with a relief grid having a plurality of directionally reflective relief elements.

In addition, the sub-region 13 is overprinted with a print line grid 14 that, on both sides of the foil strip 12, continues beyond the sub-region 13 onto the banknote paper and forms the second sub-element of the security arrangement. In the exemplary embodiment, the first sub-element in the form of the foil strip 12 and the second sub-element in the form of the imprinted print line grid 14 are firmly joined together such that the security arrangement forms a security element.

The designs and the line screens of the relief grid and of the print line grid 14 are, in the manner described in greater detail below, coordinated with each other in such a way that, when the banknote 10 is tilted, a (for example colored) movement effect is created in the overlap region 13 due to a moiré effect. For example, in the overlap region 13, multiple colored bars 15, 16 can be visible that appear to run downward or upward when the banknote 10 is tilted forward and backward.

The fundamental structure of security arrangements according to the present invention and the realization of the conspicuous colored movement effect will now be explained in greater detail with reference to FIG. 2 and FIGS. 3(*a*) and 3(*b*).

Figure 2:
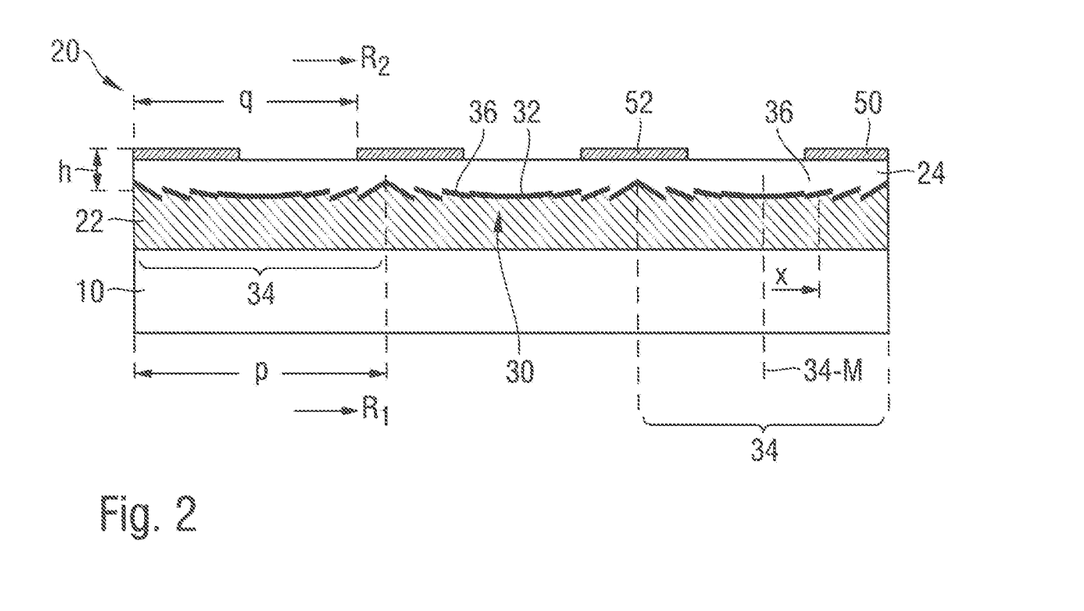

FIG. 2 shows a security arrangement 20 in cross section. The first sub-element of the security arrangement 20 is arranged on a banknote substrate 10 by means of an adhesive layer 22 and includes an embossing lacquer layer 24 in which is embossed a relief grid 30 that, prior to the application of the adhesive layer 22, was furnished with a metalization 32, for example composed of aluminum or silver.

The relief grid 30 itself consists of a plurality of connecting elongated grid elements 34 whose longitudinal axis extends, in the diagram in FIG. 2, into the plane of projection. Each grid element 34 consists of multiple parallel, line-type micromirrors 36 whose mirror inclination in the figure changes almost continuously from the left edge of the grid elements 34 to the right edge from a first, negative inclination to a second, positive inclination. For example, the inclination of a micromirror 36 can, in each case, be proportional to the signed spacing x between the micromirror 36 and the centerline 34-M of a grid element 34, such that the micromirrors 36 of a grid element 34 simulate the reflection behavior of a parabolic concave mirror.

In the exemplary embodiment, the dimension of the grid elements 34 in the transverse direction, which simultaneously constitutes the line screen p of the relief grid 30, is p=200 µm, with the width of the individual micromirrors 36 being around 22 µm. The dimension of the grid elements 34 and the micromirrors 36 in the longitudinal direction, that is, into the paper plane in FIG. 2, is multiple millimeters or even centimeters, so is significantly larger than the line screen p. The width of the grid elements 34 and especially of the micromirrors 36, in contrast, is below the resolution limit of the human eye, such that the grid elements 34 and particularly the micromirrors 36 themselves cannot (or can only to a limited extent) be resolved with the naked eye.

Nevertheless, when the metalized relief grid 30 is viewed, a fine line grid is created for a viewer, as explained in greater detail with reference to FIGS. 3(*a*) and 3(*b*), with FIG. 3(*a*) showing only the relief grid of the first sub-element of the security arrangement 20, and FIG. 3(*b*), the visual appearance of the relief grid in 3(*a*). If, for example, light 40 is perpendicularly incident from above on the relief grid 30, as shown in FIG. 3(*a*), then, for a viewer 42, the reflection condition "angle of incidence is equal to angle of reflection" is met only for a micromirror 36-B of a grid element 34.

Figure 3A:
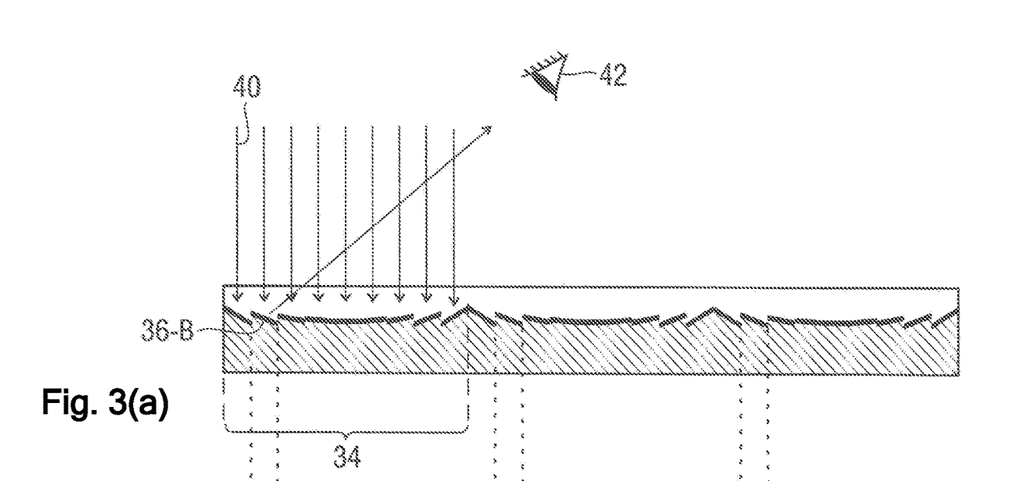
Figure 3B:
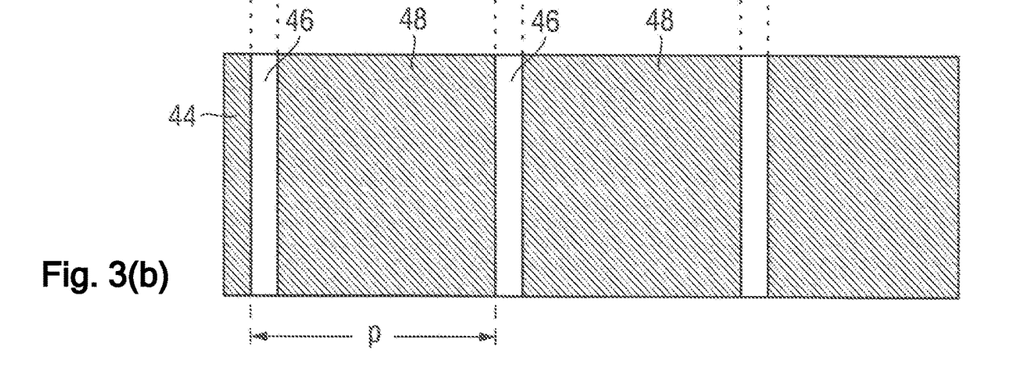

In the top view 44 shown in FIG. 3(*b*), said line-shaped micromirror 36-B thus appears as a light, fine line 46, while the regions 48 occupied by the other micromirrors reflect the incident light 40 in other spatial directions and thus appear dark for the viewer 42. Since the grid elements 34 and thus the micromirrors 36-B of the same orientation repeat at the spacing of the line screen p, the fine line grid 46 being created likewise has a line screen p.

If the relief grid 30 in FIGS. 3(*a*) and 3(*b*) is tilted from left to right (that is, about an axis that extends parallel to the longitudinal direction of the micromirrors and thus into the paper plane in FIG. 3(*a*)), then the position of the micromirror 36 for which the reflection condition is met migrates to the right such that, in top view 44, also the lines 46 of the fine line grid migrate to the right for the viewer 42. When tilted to the left, the reverse movement effect results accordingly.

Returning to the diagram in FIG. 2, the security arrangement 20 includes, in addition to said relief grid 30, a print layer in the form of a grid 50 of parallel spaced-apart print lines 52 that have a line screen q in spatial direction $R_2$ and that are imprinted on the embossing lacquer layer 24 surface opposite the relief grid 30 with a translucent printing ink. Here, the print lines 52 are aligned substantially parallel to the line-shaped micromirrors 36, and the two grids are coordinated with each other in such a way that the spatial direction $R_2$ is parallel to the spatial direction $R_1$ and the second line screen q differs only slightly from the first line screen p. In the exemplary embodiment, the second line screen q is 10% smaller than the first line screen p, so q=180 µm.

Due to the slightly different line screens of the parallel grids of the print lines 52 and of the micromirrors 36, their interplay results in a moiré effect in which a significantly coarser moiré line pattern 15, 16 (FIG. 1) becomes visible for the viewer. In the case of the presently chosen difference of 10% between the two line screens, a moiré magnification factor of about 10 results, that is, the moiré line pattern 15, 16 has about 10 times the line screen, so in the present case around 1.8 mm.

Since the light lines of the fine line grid 46 run downward or upward when the banknote 10 is tilted, also the moiré line pattern 15, 16 moves accordingly. If the fine lines 46 move by a full period length, so here by p=200 µm, then the bars 15 of the moiré line pattern likewise move by a period length, so by 1.8 mm. The microscopic movement effect of the line grid 46 that is hardly visible with the naked eye is thus magnified by the moiré effect to a movement that is easily perceptible for the viewer.

To achieve a small thickness of the security arrangement 20, the grid 50 of the print lines 52 is arranged at a small vertical spacing h above the relief grid 30. In the exemplary embodiment, the vertical spacing h is, for example, only about 10 µm, that is, only a twentieth of the line screen p.

Through the use of a translucent, for instance red, color for the print line grid 52, it is additionally achieved that the moiré line pattern 15, 16 consists alternatingly of red and white (light) lines.

Overall, in the manner described, an optically variable security arrangement is created having a one-dimensional relief grid composed of a plurality of grid elements that are each formed from multiple line-type micromirrors that are directionally reflective in different directions. The relief grid is combined with a print line grid arranged above the relief grid and, when tilted, displays an especially colored movement effect that is based on a moiré effect. Due to its small thickness, the described security arrangement is particularly well suited for application to banknotes and other value documents.

The described relief grid 30 composed of micromirrors 36 can particularly advantageously be provided in the form of a foil element in which the micromirrors 36 are cast in an embossing lacquer 24, for example a radiation-curing or thermoplastic lacquer, applied on a carrier foil and are furnished with a reflection-increasing coating, for example an aluminum metalization 32. Through the use of a foil having embossed micromirrors, a particularly high brilliance of the reflective areas and thus of the optically variable, colored movement effect is achieved.

The foil element can be applied to a banknote substrate and the carrier foil can be removed again after application to reduce the thickness such that substantially the embossing lacquer layer 24, the metalization 32 and the adhesive layer 22 are then present on the banknote 10, as shown in FIG. 2. Here, in practice, further, albeit for the present invention non-essential, layers can be provided, such as a protective lacquer layer, ink-receiving layer or primer layer.

Over said layer sequence is then printed in the manner described above the grid 50 of the print lines 52 to obtain the second sub-element of the security arrangement 20.

The grid of the print lines 50, 14 can continue beyond the edge of the relief grid 30 or of the foil strip 12, as shown in FIG. 1. In this way, for one thing, the movement effect is particularly well integrated visually into the banknote design, and for another, the counterfeit security is increased, since a foil strip 12 detached from a banknote would have to be affixed to a counterfeited note in perfect register in order to preserve the registration of the foil strip 12 and the print line grid 14. Visually, in such a design, a colored movement effect is created in the overlap region 13, while outside the overlap region 13, the print line grid 14 appears substantially as a homogeneous halftone area due to the small line spacing of the print lines (q=180 μm).

Figure 4:
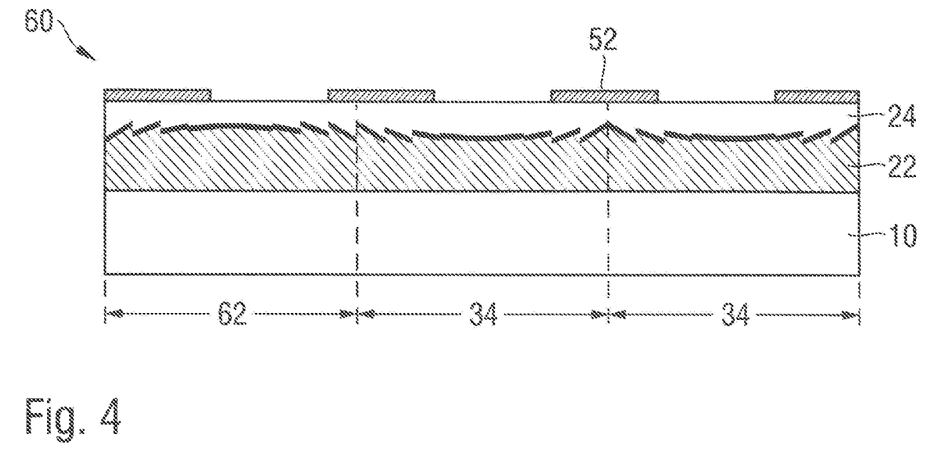

In FIG. 2, all grid elements 34 are developed to be homogeneous, with, for each grid element 34, the inclinations of the micromirrors 36 being chosen in such a way that the grid element 34 simulates the reflection behavior of a parabolic concave mirror. It is also possible to have two or more different grid elements present in a relief grid 30. For example, FIG. 4 shows a security arrangement 60 that generally follows the structure described for FIG. 2, but in which not only first grid elements 34 are provided that simulate the reflection behavior of a parabolic concave mirror, but also second grid elements 62 that simulate the reflection behavior of a parabolic convex mirror, as shown at the left edge of the image in FIG. 4.

Compared with the grid elements 34, the inclination of the micromirrors 36 is inverted in the second grid elements 62, that is, it goes from the left edge to the right edge from a first, positive inclination to a second, negative inclination. At the locations at which second grid elements 62 are provided instead of first grid elements 34, in the light line grid, for one thing, the position of the fine lines 46 produced changes, and for another, the lines produced by the convex-mirror-type grid elements 62 display an inverted movement behavior compared with the lines produced by the concave-mirror-type grid elements 34, since the sequence of the mirror inclinations is precisely inverted. For example, the lines produced by convex-mirror-type grid elements 62 can run upward when the security arrangement is tilted in one direction, while at the same time the lines produced by the concave-mirror-type grid elements 34 run downward. The movements can also run in a curve and intertwined, for instance within bands that are present in the form of a cord or a double helix.

Figure 5:
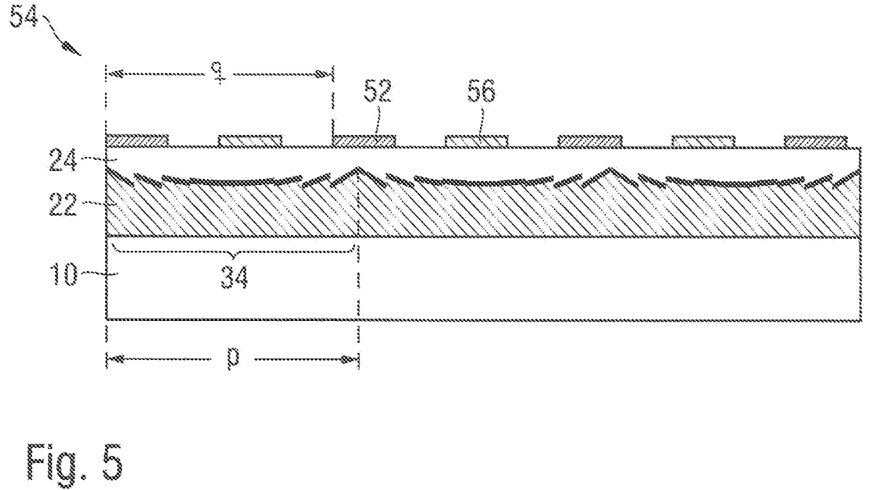

It is also possible to provide more than one line grid arranged above the relief grid. For this, FIG. 5 shows a security arrangement 54 that generally follows the structure described for FIG. 2, but in which two print line grids having parallel print lines 52, 56 are provided. Here, the print lines 56 are printed, for example with translucent green ink between the translucent red print lines 52. In the colored movement effect of the security arrangement 54, a pattern composed of migrating alternating red and green bars then appears. The print lines 52, 56 can, as in FIG. 5, be imprinted with a gap, but can also connect to each other in perfect register and completely take up the area of the line grid. Such a register-accurate print is easily possible in banknote printing particularly with small line screens q of about 100 μm, but very difficult for a potential counterfeiter to match.

In addition to the enhancement of a single movement effect by an additional color, an additional line grid can also produce a second, different movement effect. For instance, a first, for example red, print line grid can have a line screen $q_1$ that is slightly larger than the first line screen p, while a second, for example green, print line grid has a line screen $q_2$ that is slightly smaller than the first line screen p. When the security arrangement is tilted, the red and green bars created by the moiré effect then move in opposite directions. In a two-sided security arrangement, a further movement effect can also be produced on the opposite side of the relief grid and be visible from said side.

Figure 6A:
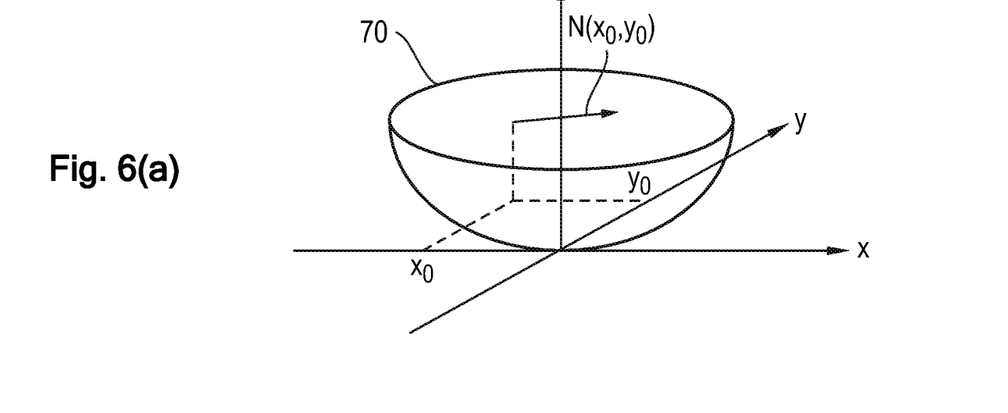

In one aspect of the present invention, the first sub-element comprises a two-dimensional relief grid composed of a plurality of grid elements 34, 62. With reference to FIG. 6($a$), the grid elements 34, 62 produce substantially the reflection behavior of a given concave and/or convex curvature, a concave curvature 70 in the form of a concave mirror being shown in the exemplary embodiment. The curvature 70 is defined at every position $(x_0,y_0)$ by a normalized local normal vector $N(x_0,y_0)$.

The normal vector $N(x_0,y_0)$ can be given, for example, by the angles $\alpha_x$ and $\alpha_y$, which include its projection into the x-z plane and the y-z plane with the x-axis and the y-axis, respectively. If the normal vector $N(x_0,y_0)$ has the component representation $N=(n_x, n_y, n_z)$ with $|N|=1$, then the angles $\alpha_x$ and $\alpha_y$ are given by $\tan(\alpha_x)=n_x/n_z$ and $\tan(\alpha_y)=n_y/n_z$.

The grid elements of the first sub-element now include, as directionally reflective relief elements, a plurality of micromirrors 36 whose inclination against the x-y plane of the first sub-element is determined by the indication of its normalized normal vector $N_{MS}(x_0,y_0)$. Here, the normal vector $N_{MS}(x_0,y_0)$ of a micromirror at a position $(x_0,y_0)$ is determined substantially by the local normal vector $N(x_0,y_0)$ of the given curvature 70 at said position, but is modified by a random or pseudorandom angle modulation of the normal vector in at least one spatial direction. Here, the normal vector $N_{Ms}(x_0,y_0)$ can be indicated in the same way as the normal vector N by the angles $\alpha_{MS,x}$ and $\alpha_{MS,y}$.

Figure 6B:
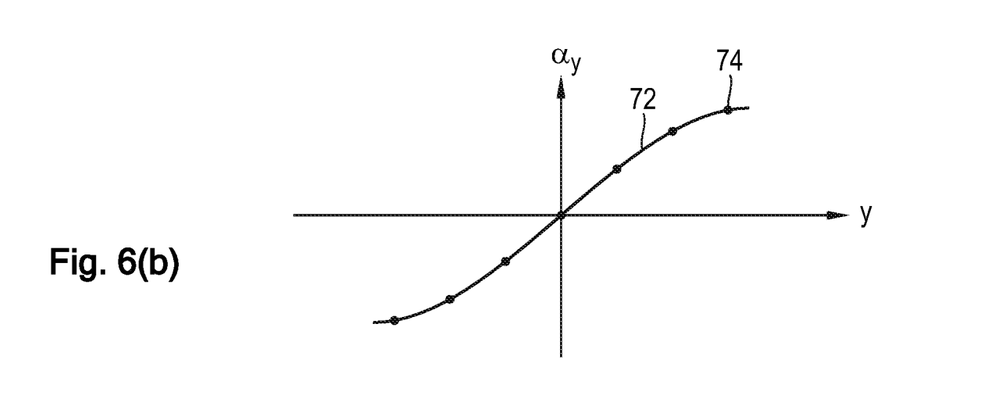
Figure 6C:
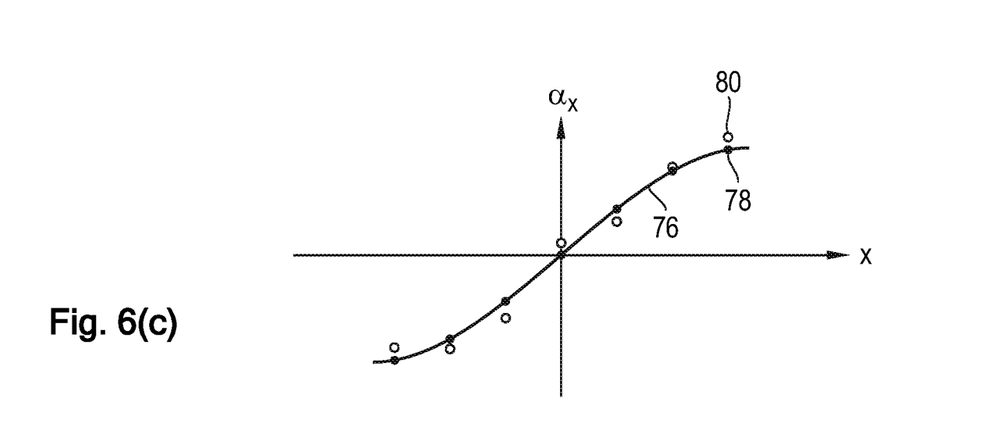

FIGS. 6($b$) and ($c$) show, based on an example, the preferred case that the normal vector $N_{MS}$ of the micromirrors 36 is pseudorandomly modified only in the x-direction, but not in the y-direction. In the exemplary embodiment, the x-direction coincides with the spatial direction perpendicular to the spatial direction $R_1$, in which the relief grid has the line screen p.

First, FIG. 6($b$) shows schematically for the y-z plane, with the curve 72, the progression of the angle $\alpha_y$ of the normal vector N of the given curvature 70 in FIG. 6($a$), and with the dots 74, the angle $\alpha_{MS,y}$ of the normal vector $N_{MS}$ for the micromirrors 36 arranged at the corresponding position. In the figure, 7 positions 74 are shown for micromirrors 36 by way of example, but it is understood that also a smaller or larger number of micromirrors 36 can be provided. As depicted in FIG. 6($b$), at every position of a micromirror, the y-angle of the normal vector $N_{MS}$ is equal to the y-angle of the normal vector N, that is, $$\alpha_{MS,y}=\alpha_y.$$

FIG. 6($c$) shows schematically for the x-z plane, with the curve 76, the progression of the angle $\alpha_x$ of the normal vector N of the given curvature 70 in FIG. 6(a), and with the full dots 78, the angle of the normal vector $N_{MS}$, for the micromirrors 36 arranged at the corresponding position, that would result for an unmodified x-angle. But the x-angles of the micromirrors are indeed pseudorandomly modulated in that there is added to the x-angle of the $\alpha_x$ of the normal vector N an angle modulation that varies pseudorandomly between 3° and +3°:

$$\alpha_{MS,x}=\alpha_x+A_{max}*\text{rand}(-1,1),$$

where $A_{max}=3°$ and rand(−1,1) is a function that yields a pseudorandom number in the interval [−1,1]. The resulting values of the angle $\alpha_{MS,x}$ are marked in FIG. 6(c) with unfilled dots 80. Also in the x-direction, only 7 positions are shown by way of example for micromirrors 36, but it is understood that also a smaller or larger number of micromirrors 36 can be provided.

For a general micromirror 36 at position $(x_0,y_0)$, the normal vector $N_{MS}(x_0,y_0)$ results in the same way:

$$\alpha_{MS,x}=\alpha_x+A_{max}*\text{rand}(-1,1),$$

$$\alpha_{MS,y}=\alpha_y,$$

where $\alpha_x$ and $\alpha_y$ represent the x- and y-angle, respectively, of the normal vector $N(x_0,y_0)$ of the given curvature 70 at the position $(x_0,y_0)$.

Through this measure, the reflection behavior of the given curvature 70 is produced substantially by the micromirrors 36 and, in addition, in the x-direction, a noise produced by the pseudorandom modulation is overlaid. The extent of the additional noise can be set as desired by the value $A_{max}$.

In principle, also the y-angle $\alpha_{MS,y}$ of the normal vector $N_{MS}$ can be modified by a random or pseudorandom function, although the random components should be chosen to be not too large in order to preserve the reflection behavior of the given curvature 70 to the greatest extent possible. For example, for the x-angle, $A_{max,x}=3°$ can be chosen, and for the y-angle, $A_{max,y}=0.3°$.

Further, it is understood that the given curvature 70 need not be the same for all grid elements 34, 62. In particular, the given curvature 70 can already include a location-dependent modulation that extends across multiple grid elements and that, in combination with a regular dot and/or line grid, produces a pattern or a piece of information, especially a viewing-angle-dependent colored and dynamic feature.

Figure 7:
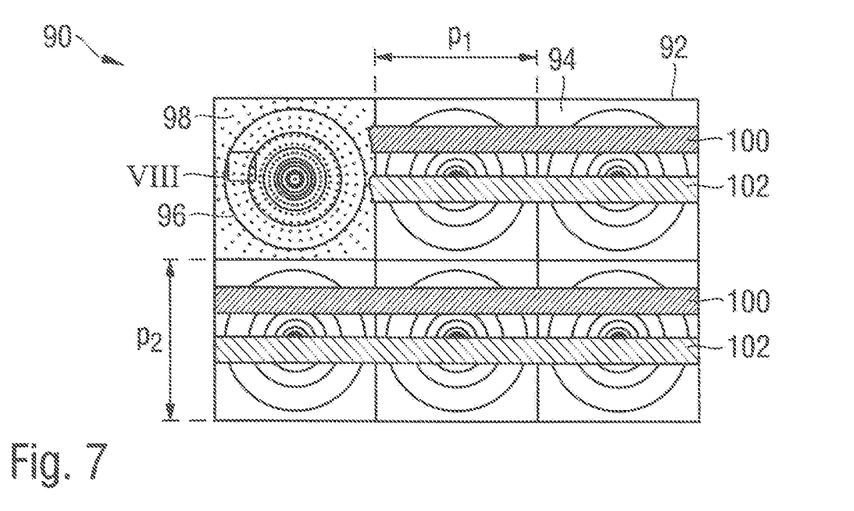

A further aspect of the present invention is illustrated with reference to FIGS. 7 and 8. FIG. 7 first shows a top view of a security arrangement 90 having a two-dimensional relief grid 92 that consists of a plurality of grid elements 94 that connect with each other in both spatial directions. The line screens $p_1$, $p_2$ in the two spatial directions are the same in the exemplary embodiment shown and are both, for example, 200 µm. Each grid element 94 is formed from a plurality of small micromirrors that are inclined against the x-y plane of the relief grid 92 and, at the same time, are oriented such that, together, they simulate the reflection behavior of a concave mirror (for instance according to FIG. 6(a)). In the top view in FIG. 7, for illustration, the circular contour lines of the simulated concave mirror are marked with solid lines 96, while the dashed lines 98 indicate the direction of the inclination of the simulated concave mirror and thus also the local inclination of the micromirrors.

Here, the relief grid 92 is, as illustrated in FIG. 5, combined with two print line grids having print lines 100, 102 of different colors. For graphical reasons, the print lines are interrupted in the upper left grid element 94 in the diagram in FIG. 7 in order to make the dashed inclination lines 98 visible there. As described above, due to the interplay of the relief grid 92 and the grid of the print lines 100, 102, a moiré effect results, due to which the viewer sees a colored movement effect with two different-colored bars that move up and down when the security arrangement 90 is tilted against a light background.

Figure 8A:
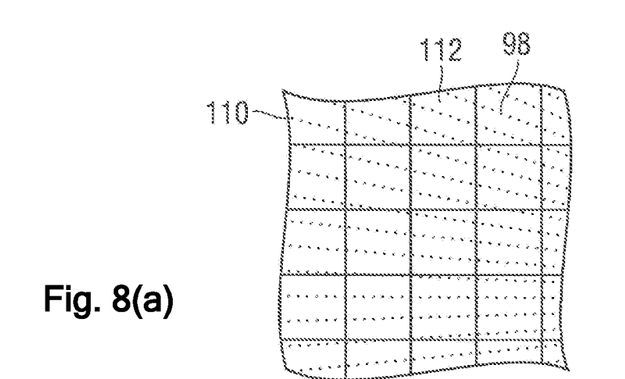
Figure 8B:
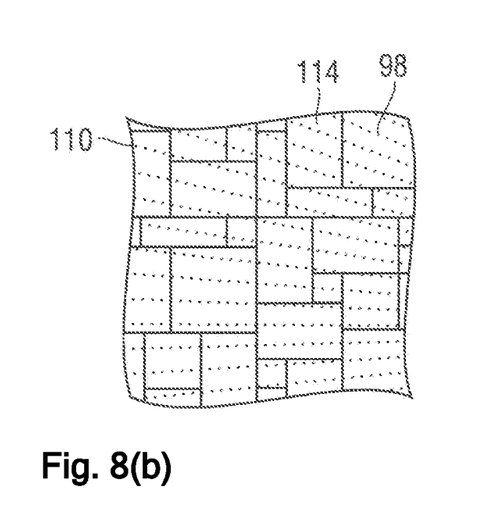
Figure 8C:
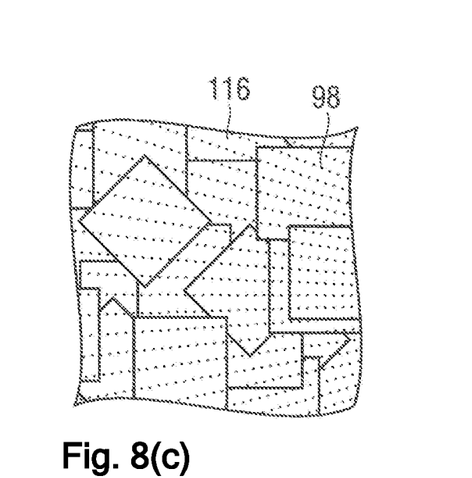

The specific arrangement of the micromirrors within the grid elements 94 is illustrated in FIGS. 8(a) to 8(c), which in 8(a) to 8(c) shows in each case, with reference sign 110, the section VIII in FIG. 7 in top view in greater detail. With reference first to FIG. 8(a), the micromirrors 112 can be arranged regularly in a grid. Here, the dashed lines 98 indicate the inclination of the micromirrors 112, which corresponds to the local inclination of the simulated concave mirror at the respective position.

In addition to a regular arrangement according to FIG. 8(a), particularly an aperiodic arrangement of the micromirrors may be used, through which potentially undesired diffraction effects can be avoided. While, namely, the micromirrors in a periodic arrangement are arranged on the grid points of a regular grid screen, in an aperiodic arrangement, there is no simple, regular relationship between the positions of adjacent micromirrors. As a result, a constructive interference of the light reflected on adjacent micromirrors, and thus the creation of a superimposed diffraction pattern, is reliably prevented.

One possibility for filling the areal region of a grid element 94 aperiodically with micromirrors 114 is depicted in FIG. 8(b). Here, the areal region of the grid element 94 is irregularly divided into rectangular tiles whose size (X,Y) in each case is (a*d, b*d), where d=5 µm and a and b, independently of one another, are each equal to 1, 2 or 3. The smallest possible tile thus has a size of 5 µm×5 µm (a=b=1) such that an achromatic reflection is ensured. The largest possible tile has a size of 15 µm×15 µm (a=b=3) such that the pattern height of the associated micromirrors 114, for a maximum angle of inclination, $\alpha_{max}$, is limited to $$h_{max}=15 \text{ µm}*\sin \alpha_{max}.$$

The inclination of the micromirrors 114 is chosen in accordance with the local inclination of the simulated concave mirror at the location of the respective micromirror 114, as illustrated by the dashed lines 98.

FIG. 8(c) illustrates a further possibility for filling the areal region of a grid element 94 aperiodically with micromirrors 116. In this variant, not only the position, but also the shape of the micromirrors 116 varies in an irregular and thus aperiodic manner. In choosing the irregular shapes, care is taken that no sub-regions having dimensions below 2 µm are created.

Figure 10:
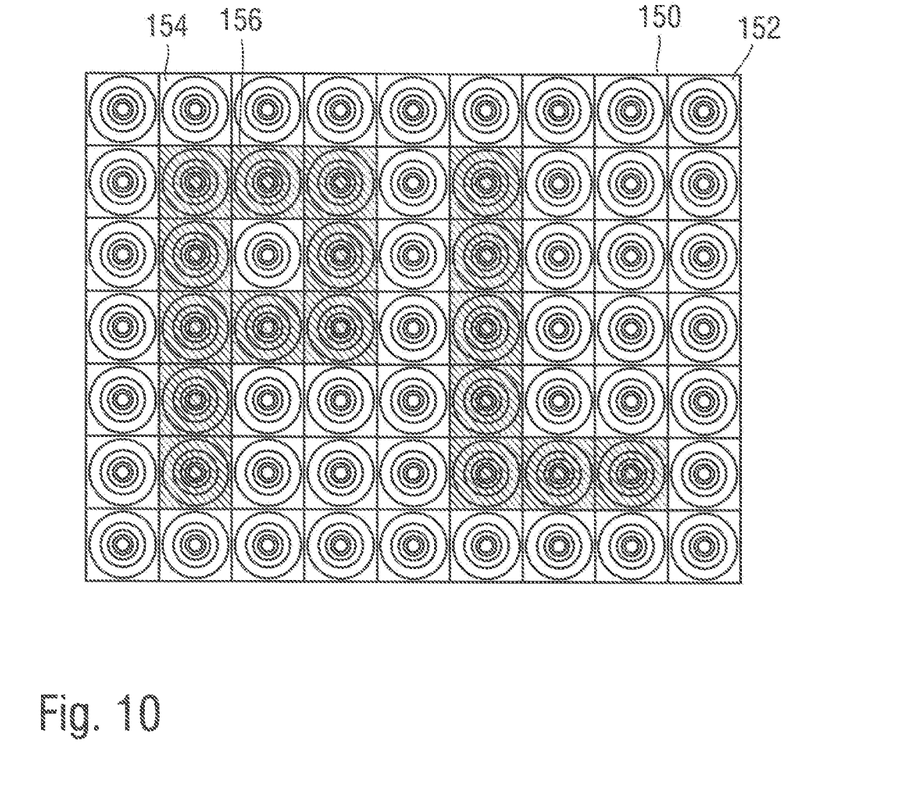

In the specific development of the grid elements, as an additional authenticity safeguard, microimages or other codes can be hidden, as explained with reference to FIG. 10. The figure shows a section of a top view of the two-dimensional relief grid 150 of a security arrangement according to the present invention. For the sake of clarity, the associated print line grid of the security arrangement is not depicted in FIG. 10.

The two-dimensional relief grid 150 consists of a plurality of grid elements 152 that connect to each other in two spatial directions, as already generally explained above. As a distinctive feature, in the embodiment in FIG. 10, two different kinds of grid elements 154, 156 are provided that, despite different microscopic formations, have the same optical effect macroscopically and are therefore not distinguishable when the security arrangement is viewed with the naked eye.

Here, the first and second grid elements 154, 156 differ in their composition of relief elements and/or in the arrangement of the relief elements, such that their different embodiments can be detected with auxiliary means, such as a microscope, and can be used as a hidden authenticating feature. However, the shared optical effect of the relief elements of the grid elements 154, 156 is the same, such that, macroscopically, the grid elements are optically equivalent. The first and second grid elements 154, 156 are arranged in the form of a motif, not visible with the naked eye, in the form of a pattern, characters or a code. FIG. 10 shows, by way of example, an arrangement of the second grid elements 156 in the form of the letters "PL" against the background of the first grid elements 154. The arrangement of the first and second grid elements 154, 156 can, of course, also include other information, such as an embossing tool identifier or a manufacturer identifier.

Specifically, the relief elements are especially formed by, inclined against the plane of the relief grid 150, small micromirrors of the kind already described that together simulate, for example, the reflection behavior of a concave or convex mirror. Here, the micromirrors of the first and second grid elements 154, 156 can have, for example, different sizes, for instance 5 μm×5 μm in the first grid elements 154 and 10 μm×10 μm in the second grid elements 156. Since the normal vector of the micromirrors in both grid elements is determined in each case, independently of the size, by the modulated local normal vector of the given curvature, the first and second grid elements produce the same optical effect and are not distinguishable with the naked eye.

A further possibility consists in developing the micromirrors to have different contours, for example having square contours in the first grid elements 154 and having elongated rectangular or hexagonal contours in the second grid elements 156. Here, too, the grid elements 154, 156 are optically equivalent, since the normal vectors of the micromirrors are determined in each case, independently of the contour shape, by the modulated local normal vector of the given curvature.

The differences between the two grid elements 154, 156 can also be in the spatial arrangement of the micromirrors, for example in a periodic arrangement of the micromirrors in the first grid elements 154 and in an aperiodic arrangement in the second grid elements 156. The grid elements can also comprise two differing periodic arrangements or two differing aperiodic arrangements. Again, the grid elements 154, 156 are optically equivalent, since the normal vectors of the micromirrors are determined in each case, independently of the spatial arrangement, by the modulated local normal vector of the given curvature.

Further, the first and second grid elements can differ by the angle modulation of the normal vector in at least one spatial direction. In the angle modulation defined in connection with FIGS. 6(*a*) to 6(*c*), the x-angle of the micromirrors of the first grid elements 154 can have, for example, a variation $A_{max}=2°$, while the x-angle of the micromirrors of the second grid elements 156 have a variation $A_{max}=5°$. Such changes in the variation range are detectable only with sophisticated methods and thus present a high barrier for the potential counterfeiter. In another design, the micromirrors of the first grid elements 154 can have a variation of only the x-angle, while the micromirrors of the second grid elements 156 have a variation of only the y-direction or no or a negligible variation.

Figure 9A:
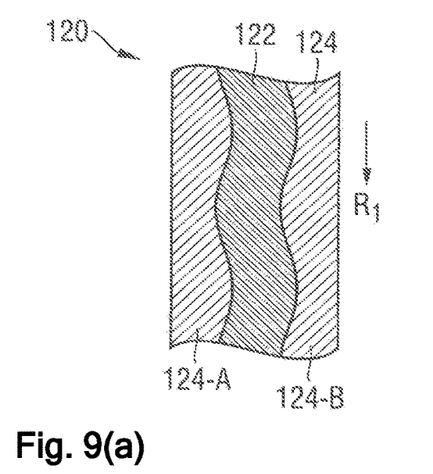
Figure 9B:
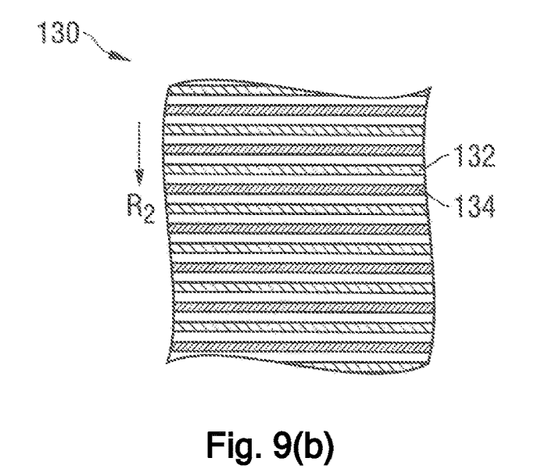
Figure 9C:
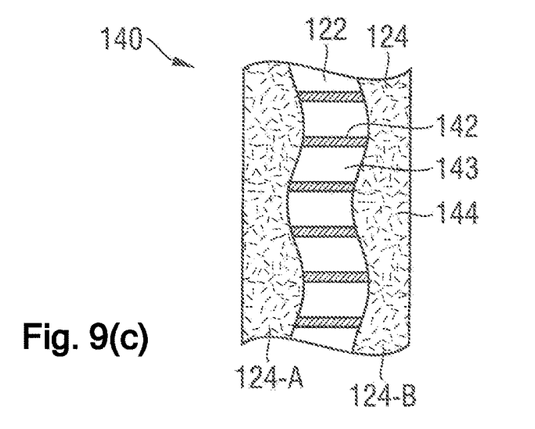

A further aspect of the present invention is illustrated in FIGS. 9(*a*) to 9(*c*). Here, FIG. 9(*a*) shows a section of the first sub-element 120 of a security arrangement 140, the sub-element 120 constituting a foil strip applied to a security document. In the manner already generally explained above, the first sub-element 120 includes a two-dimensional relief grid that is composed of a plurality of grid elements and that is developed having a line screen below 500 μm in at least one spatial direction $R_1$.

The first sub-element 120 consists of a motif region 122 having the desired movement effect and a background region 124 that contrasts with said effect. In the manner described in greater detail below, the grid elements are developed differingly in the two regions to produce a good visual contrast between the motif region 122 and the background region 124.

Specifically, in the motif region 122 in the exemplary embodiment, the relief elements of the grid elements are developed to be directionally reflective in different directions and the first line screen p is location-dependently modulated, such that the first sub-element 120 is developed to be "smart." In the background region 124 of the first sub-element, the relief elements are modified with respect to the relief elements of the motif region to produce, in the verification position of the security arrangement 140, a good visual contrast to the movement effect of the motif region. More precisely, for this, in the exemplary embodiment shown, reflective micromirrors are arranged in the motif region 122, while the micromirrors in the background region 124 are coated with light-absorbing moth-eye patterns and are thus deactivated as reflection elements.

The second sub-element 130 shown in a highly magnified section in FIG. 9(*b*) includes, in the exemplary embodiment, two print line grids having print lines 132, 134 of different colors that are arranged at a line screen q in a regular pattern repeat in a spatial direction $R_2$. The print lines 132, 134 are arranged regularly without location-dependent modulation such that the second sub-element 130 is developed to be "dumb."

FIG. 9(*c*) shows schematically the appearance of the complete security arrangement 140 in the verification position, in which the first sub-element 120 and the second sub-element 130 are stacked vertically in such a way that said spatial direction $R_1$ of the first sub-element 120 is parallel to said spatial direction $R_2$ of the second sub-element 130 and the vertical spacing between the relief grid and the line grid is less than half of the line screen p.

When the security arrangement 140 is tilted, there is created in the manner described above, in the motif region 122 of the relief grid, due to the interplay of the relief grid of the first sub-element 120 and of the line grid of the second sub-element 130, a conspicuous movement effect, for example in the form of colored bars 142, 143 that run upward or downward. In the background region 124, the micromirrors there reflect, in contrast, due to the moth-eye patterns, practically no light, such that no movement effect is created there, but rather, the background region 124 constitutes a dark background 144 for the colored movement effect of the motif region 122. The contrast of the visual effects in the motif region 122 or the background region 124 additionally directs the attention of the viewer to the colored movement effect and thus increases its perceptibility and safeguarding effect.

The background region 124 can not only be darkened with respect to the motif region 122, but for example also be lightened, or it can also appear having a considerably different hue or gloss, as already generally described above.

Specifically, the background region 124 can, for example, be developed having elongated roof-like embossings of line screen q in direction $R_2$ that are registered with the print lines 132, 134 in such a way that, in the sub-region 124-A, the print lines 132 come to lie on the ascending roof embossing areas, and in the sub-region 124-B, on the descending roof embossing areas, and that, accordingly, in the sub-region 124-A, the print lines 134 come to lie on the descending embossing areas, and in the sub-region 124-B, on the ascending embossing areas. In this way, when the security arrangement 140 is viewed obliquely from below, the background region 124 appears in the color of the print lines 132 in the sub-region 124-A and in the color of the print lines 134 in the sub-region 124-B, while the color impression reverses when viewed obliquely from above, so for example when the security arrangement is tilted. At the same time, in contrast thereto, the motif region 122 displays the colored movement effect with running colored bars 142, 143 already described.

Such a precise registration of roof-like embossings with the print lines 132, 134 is very technically sophisticated and hardly imitable for a counterfeiter. Alternatively, the roof-like embossings and the print lines can also be unregistered such that, due to the interplay of the embossing and the print lines, moiré effects result that likewise constitute a visual contrast to the movement effect of the motif region. In this simpler production variant, the exact expression of the moiré effects depends on the exact relative position of the grids involved on the respective ups and will thus differ somewhat, for example in banknote production, from up to up.

The invention claimed is:

1. An optically variable security arrangement for securing valuable articles, comprising:
   a first sub-element having a two-dimensional relief grid that is composed of a plurality of grid elements and that has, in at least one spatial direction $R_1$, a first line screen p below 500 μm, and in which the grid elements are each formed from at least two relief elements that are directionally reflective in different directions; and
   a second sub-element having at least one dot and/or line grid that, in a spatial direction $R_2$, has a second line screen q;
   wherein the first and second sub-elements, in a verification position, are stacked vertically in such a way that said spatial direction $R_1$ of the first sub-element is parallel to said spatial direction $R_2$ of the second sub-element and a vertical spacing between the relief grid and the dot and/or line grid is less than half of the line screen p;
   wherein the second line screen q differs only slightly from the first line screen p, by less than one-fifth, and/or the first line screen p and/or the second line screen q being location-dependently modulated such that, in said verification position, a movement effect is created by an interplay of the relief grid and the dot and/or line grid when the security arrangement is tilted;
   wherein the grid elements of the first sub-element each produce substantially a reflection behavior of a given curvature, being concave and/or convex, that is defined at each position by a normalized local normal vector; and
   wherein the grid elements of the first sub-element including, as directionally reflective relief elements, a plurality of micromirrors whose inclination against an x-y plane of the first sub-element is determined by indicating its normalized normal vector, and the normal vector of a micromirror at a position $(x_0,y_0)$ being determined by the local normal vector of the given curvature at said position, modified, by a random or pseudorandom angle modulation of the normal vector in at least one spatial direction.

2. The security arrangement according to claim 1, wherein only in one spatial direction is there a modification by a random or pseudorandom angle modulation of the normal vector, the angle modulation having a maximum value of less than 5°.

3. The security arrangement according to claim 1, wherein there is a modification by a random or pseudorandom angle modulation of the normal vector in two spatial directions that are perpendicular to each other, the maximum angle modulation being of different sizes in the two spatial directions and a larger maximum angle modulation being at least 2 times larger than the smaller maximum angle modulation.

4. The security arrangement according to claim 1, wherein the grid elements of the first sub-element produce substantially the reflection behavior of a concave or convex mirror, the reflection behavior being of a parabolic concave or parabolic convex mirror.

5. An optically variable security arrangement for securing valuable articles, comprising:
   a first sub-element having a two-dimensional relief grid that is composed of a plurality of grid elements and that has, in at least one spatial direction $R_1$, a first line screen p below 500 μm, and in which the grid elements are each formed from at least two relief elements that are directionally reflective in different directions; and
   a second sub-element having at least one dot and/or line grid that, in a spatial direction $R_2$, has a second line screen q;
   wherein the first and second sub-elements, in a verification position, being stacked vertically in such a way that said spatial direction $R_1$ of the first sub-element is parallel to said spatial direction $R_2$ of the second sub-element and a vertical spacing between the relief grid and the dot and/or line grid is less than half of the line screen p;
   wherein the second line screen q differs only slightly from the first line screen p, by less than one-fifth, and/or the first line screen p and/or the second line screen q being location-dependently modulated such that, in the verification position, a movement effect is created by an interplay of the relief grid and the dot and/or line grid when the security arrangement is tilted; and
   wherein the relief elements of at least a portion of the grid elements are arranged aperiodically in an areal region of the respective grid element.

6. The security arrangement according to claim 5, wherein the relief elements are formed by micromirrors that are inclined against an x-y plane of the first sub-element and the micromirrors are arranged in varying shapes and/or sizes in the areal region of the respective grid element.

7. The security arrangement according to claim 5, wherein the micromirrors in the plane of the areal region of the respective grid element have a minimum dimension of 2 μm or more.

8. The security arrangement according to claim 5, wherein the relief elements of all grid elements are arranged aperiodically in the areal region of the respective grid element.

9. The security arrangement according to claim 1, wherein the first sub-element and the second sub-element are firmly joined together in the verification position.

10. The security arrangement according to claim 1, wherein, in a sub-region, the two-dimensional relief grid includes first and second optically equivalent grid elements whose composition composed of relief elements differs and/or in which the arrangement of the relief elements differs, the first and second grid elements being arranged in the form of a motif, not visible with a naked eye, in the form of a pattern, characters or a code.

11. The security arrangement according to claim 10, wherein the first and second grid elements differ in the spatial arrangement of the relief elements within the grid elements, wherein the relief elements of the first grid elements are arranged periodically and the relief elements of the second grid elements aperiodically, or vice versa.

12. The security arrangement according to claim 10, wherein the first and second grid elements differ in the contour shape and/or size of the relief elements included.

13. The security arrangement according to claim 10, wherein the first and second grid elements differ by the angle modulation of the normal vector in at least one spatial direction.

14. A data carrier having a security arrangement according to claim 1, at least one line grid of the security arrangement covering the relief grid in sub-regions and, in sub-regions outside of the relief grid, extending to the data carrier provided with the security arrangement.

15. The security arrangement according to claim 5, wherein the first sub-element and the second sub-element are firmly joined together in the verification position.

16. The security arrangement according to claim 5, wherein, in a sub-region, the two-dimensional relief grid includes first and second optically equivalent grid elements whose composition composed of relief elements differs and/or in which the arrangement of the relief elements differs, the first and second grid elements being arranged in the form of a motif, not visible with a naked eye, in the form of a pattern, characters or a code.

17. The security arrangement according to claim 16, wherein the first and second grid elements differ in the spatial arrangement of the relief elements within the grid elements, wherein the relief elements of the first grid elements are arranged periodically and the relief elements of the second grid elements aperiodically, or vice versa.

18. The security arrangement according to claim 16, wherein the first and second grid elements differ in the contour shape and/or size of the relief elements included.

19. The security arrangement according to claim 16, wherein the first and second grid elements differ by the angle modulation of the normal vector in at least one spatial direction.

20. A data carrier having a security arrangement according to claim 5, at least one line grid of the security arrangement covering the relief grid in sub-regions and, in sub-regions outside of the relief grid, extending to the data carrier provided with the security arrangement.

21. The security arrangement according to claim 5, wherein the relief elements are formed by micromirrors that are inclined against an x-y plane of the first sub-element and the micromirrors are arranged in varying shapes and/or sizes in the areal region of the respective grid element, and wherein the micromirrors in the areal region are arranged in aperiodically or irregularly varying shapes and/or sizes.

* * * * *